D. W. DURBIN.
SHOCK ABSORBER.
APPLICATION FILED OCT. 15, 1919.

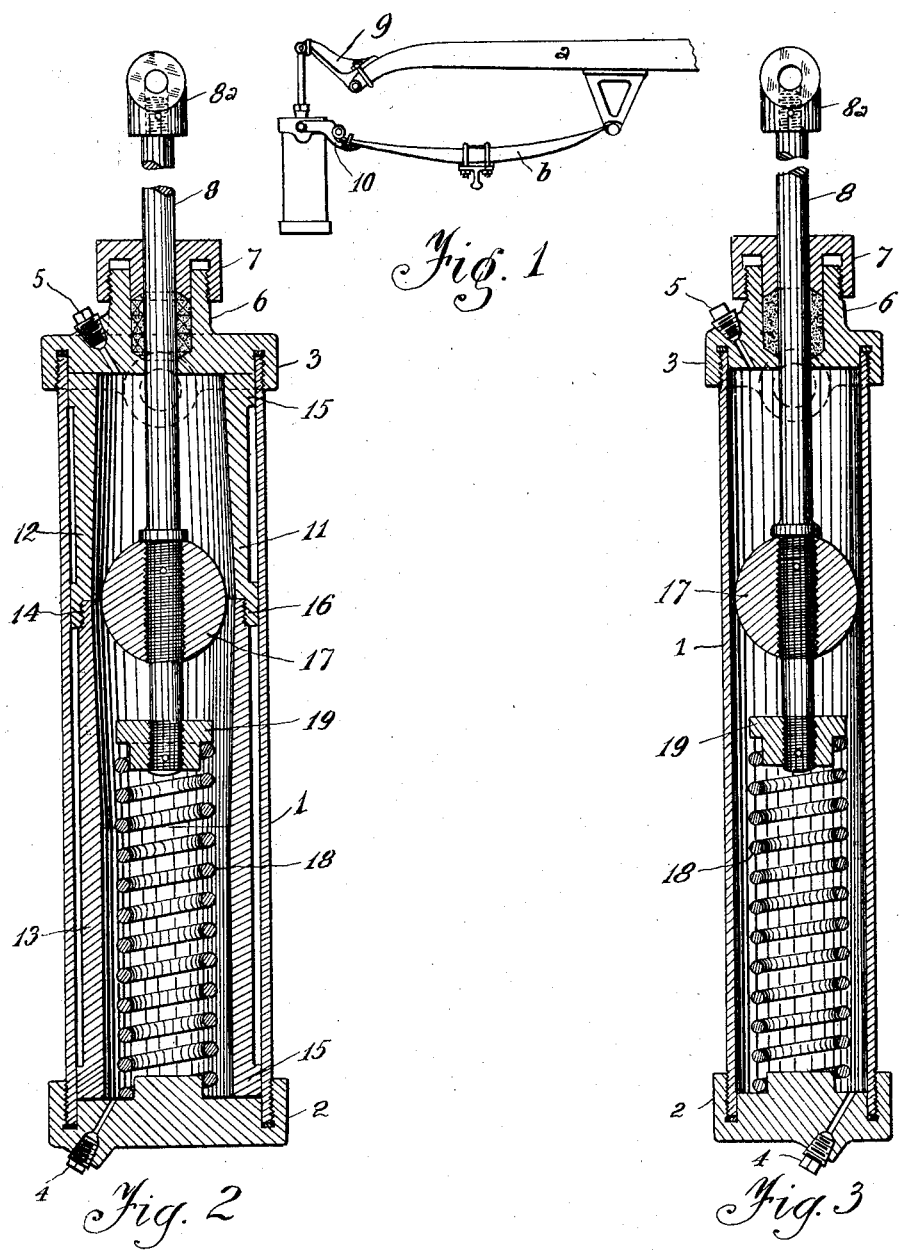

1,351,558.

Patented Aug. 31, 1920.
2 SHEETS—SHEET 2.

INVENTOR.
David W. Durbin
By Ralph Donath
Attorney

UNITED STATES PATENT OFFICE.

DAVID W. DURBIN, OF BRIDGEVILLE, PENNSYLVANIA.

SHOCK-ABSORBER.

1,351,558.

Specification of Letters Patent.  Patented Aug. 31, 1920.

Application filed October 15, 1919. Serial No. 330,902.

*To all whom it may concern:*

Be it known that I, DAVID W. DURBIN, citizen of the United States, residing at Bridgeville, in the county of Allegheny and State of Pennsylvania, have invented certain new and useful Improvements in Shock-Absorbers, of which the following is a specification.

This invention relates to shock absorbers, and more particularly to a device of this type adapted to be used in connection with automobiles and similar vehicles.

One of the main objects of the invention is to provide a shock absorber of very simple construction which may be produced at low cost and may be readily applied. A further object is to provide means for presenting uniformly increased resistance to movement of the automobile body vertically in either direction beyond its normal position so as to absorb shocks while preventing sudden checking of the movement. Further objects will appear from the detailed description.

In the drawings:—

Figure 1 is a side view of a shock absorber illustrating the preferred method of installing same upon an automobile.

Fig. 2 is a central vertical sectional view through the shock absorber.

Fig. 3 is a similar view of a modified form.

Figure 4:
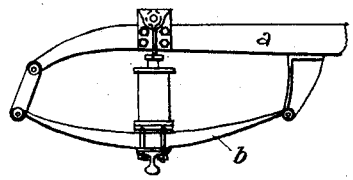
Fig. 4 is a side view illustrating another method of installing the shock absorber upon an automobile.

The shock absorber is provided with a cylindrical body 1 the ends of which are closed by removable heads 2 and 3 provided with drain and filling openings closed by screw plugs 4 and 5, respectively. Upper head 3 is provided with a centrally bored and exteriorly threaded nipple 6 which coöperates with a flanged nut 7 to provide a packing gland for a piston rod 8 extending into the body axially thereof, this rod being provided at its upper end with an attaching eye $8^a$. In Fig. 1, I have illustrated the shock absorber applied by attaching eye $8^a$ to a bracket 9 secured to the end of sill bar *a* of an automobile, the body being rockably supported for movement about an axis extending transversely of the frame by a bracket 10 secured to the outer end of spring *b*; but it will be understood that this device may be applied in any other suitable manner preferred.

A liner 11 is positioned within body 1, this liner consisting of two sections 12 and 13 secured together at their inner ends by a screw joint 14 or in any other suitable manner. These sections are provided at their outer ends with outer annular flanges 15, and the upper section is provided at its inner end with a similar flange 16 which forms an element of the screw joint, all of these flanges coöperating to properly center the liner within the casing or body 1.

The upper section of the liner is provided with a bore tapering toward the outer end thereof, whereas the lower half of the lining is also provided with a similar bore of equal length and diameters but is then continued straight downward to provide sufficient room for coil spring 18, which is held in position by the washer 19 secured to the prolongation of the piston rod 8 below the spherical or ball piston 17, the latter being also secured to the piston rod 8.

The bore of the tapered lining is such that, at the points corresponding to the upper or lower extreme positions of the piston, it will be but minutely greater in diamter than the piston, for the purpose of eliminating all possibilities of the piston and liner jamming together.

The purpose of the coil spring 18 is to carry the permanent load which would correspond to the car spring at the point of application of the shock absorber, and it is so dimensioned that under normal load and smooth roads the piston is positioned centrally, or nearly, so that is at the point of greatest bore of the liner. Upon relative movement between the piston and liner in either direction, due to shocks, the space about the ball through which the oil, or other suitable liquid with which the liner is filled, will be uniformly decreased as the piston approaches either end of the liner. In this manner uniform increasing fluid resistance is applied to movement of the vehicle body which serves to gradually check and stop this movement thus absorbing all shocks and preventing rebound of the body while also avoiding undesirable abrupt stopping or checking of movement of the body of the vehicle. As the piston does not come into direct contact with the liner, friction and wear are reduced to a minimum this securing maximum efficiency. Also, by using a ball shaped piston it will be noticed that the pressure upon the piston will at all time be perfectly balanced, thus eliminating all possibilities of causing distorting strains upon the piston rod, thereby insuring a permanently straight rod and consequently less wear on the stuffing box.

In the form illustrated in Fig. 3, the liner is omitted, the piston operating in the body or casting 1 which is of uniform interior diameter. In this case, the piston is of slightly less diameter than the bore of the casing so as to permit the oil to flow slowly about the piston upon movement of the same in either direction. This is intended as a simple form of shock absorber which may be made at a low cost, and is very efficient.

In cases where the absorber is mounted on an automobile, independently of the car springs, as shown in Fig. 4, it will not be necessary to use the inner coil spring 18 shown in Figs. 2 and 3 as the permanent load will be entirely taken up by the car springs, and the device will be called upon to solely perform its duty of absorbing the effect of sudden shocks.

Figure 5:
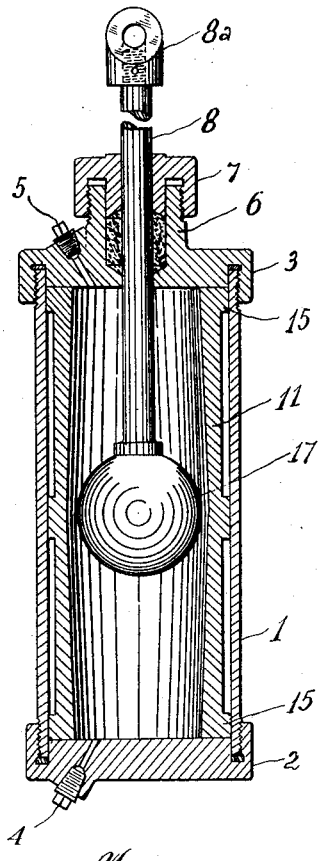
Fig. 5 is a central vertical sectional view through the type of shock absorber used in installation shown in Fig. 4.
Figure 6:
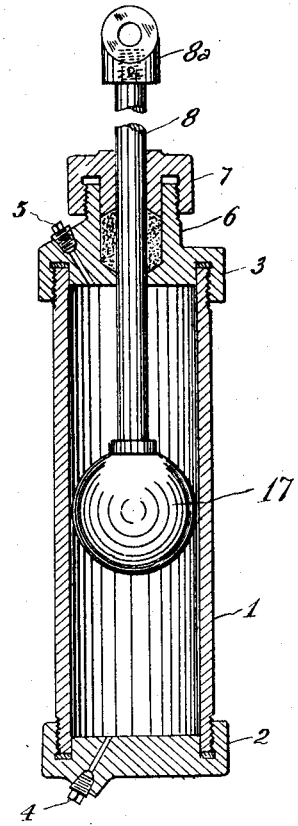
Fig. 6 is a similar view of a modified form applicable in installation shown in Fig. 4, also.

Therefore the device can be simplified and shortened as shown in Figs. 5 and 6; Fig. 5 is the preferred form and is of similar design as Fig. 2. Fig. 6, like Fig. 3, is a simplified design which may be made at lower cost, while still embodying the principal features of the preferred design.

As will be readily understood, it may be found desirable in practice to resort to modifications in the construction of the device and I do not, therefore, wish to limit myself to the precise forms described and illustrated, except in so far as I may be limited by the appended claims.

What I claim is:

1. In a shock absorber, a cylinder having a bore tapering toward each end, a piston of less diameter than the smallest diameter of said bore operable therein, a piston rod operable through one end of the cylinder and secured to said piston.

2. In a shock absorber, a cylinder having a bore tapering toward each end, a piston of less diameter than the smallest diameter of said bore operable therein, a piston rod operable through one end of the cylinder and secured to said piston, and a coil spring guided by a washer secured to said rod and below said piston.

3. In a shock absorber, a cylinder having a bore tapering toward each end, a piston rod slidable through one end of the cylinder centrally thereof, a ball piston operable in the cylinder secured on said rod and of less diameter than the smallest diameter of the bore of the cylinder, a coil spring located below said piston and means for guiding said coil spring.

4. In a shock absorber, a cylinder removable heads closing the ends of said cylinder, a removable liner fitting within the cylinder and having a bore tapering from its center toward each end, a rod slidable through one of said heads centrally thereof, a piston secured on said rod and operable in the liner, said piston being of less diameter than the smallest diameter of the bore of the liner, a coil spring located below said piston and means for guiding said coil spring.

5. In a shock absorber, a cylinder, removable heads closing the ends of the cylinder, a liner removably mounted in the cylinder consisting of two sections detachably secured together at their ends and each having a bore tapering from its inner end, a rod slidable through one of said heads, and a spherical piston secured on said rod and operable in the bore of the liner, said piston corresponding approximately in diameter to the diameter of the liner bore at the points corresponding to the upper and lower extreme positions of the piston in said liner.

6. In a shock absorber, a cylinder, removable heads closing the ends of the cylinder, a liner removably mounted in the cylinder consisting of two sections, detachably secured together at their inner ends, the upper section having a bore tapering from its inner end, the lower section having a similar tapering bore and in addition a straight bore in its lower end, a rod slidable through one of said heads, a spherical piston secured on said rod and operable in the bore of the liner, said piston having a diameter approximately equal to that of the liner at the points corresponding to the upper and lower extreme positions of said piston, a coil spring located below said piston and means for guiding said spring axially relatively to said rod.

In testimony whereof I affix my signature.

DAVID W. DURBIN.